United States Patent Office 3,418,326
Patented Dec. 24, 1968

3,418,326
5-ALKYL-13-POLYCARBON-GONANES
George C. Buzby, Jr., Philadelphia, and Herchel Smith, Wayne, Pa., assignors to American Home Products Corporation, New York, N.Y., a corporation of Delaware
No Drawing. Filed Mar. 22, 1966, Ser. No. 536,294
6 Claims. (Cl. 260—397.4)

ABSTRACT OF THE DISCLOSURE 13-polycarbon-lower alkyl 5-low alkyl gon-3-ones possessing antiandrogenic activity are prepared from 13-polycarbon-lower alkyl gon-4-enes by addition of a lower alkyl Grignard reagent at the 4,5 unsaturation.

This invention relates to compositions of matter classified in the art of chemistry as substituted gonanes.

As used in this specification, unless otherwise indicated, the chemical compositions employed as starting materials and the products obtained therefrom are the 13-racemates.

The invention sought to be patented in its composition aspect is described as residing in the concept of a 17-hydroxy-5-lower alkyl-13-lower polycarbon-alkylgonane.

The tangible embodiments of the composition aspect of the invention possess the inherent general physical properties of being white crystalline solids, are substantially insoluble in water, and are generally soluble in polar solvents such as dimethylacetamide. Examination of compounds produced according to the hereinafter described process reveals, upon infrared and nuclear magnetic resonance spectra analyses, spectral data supporting the molecular structure hereinbefore set forth. For example, the 5-alkyl group is evident in the nuclear magnetic resonance and the disappearance of the 4,5-double bond is evident in the ultraviolet and infrared. The aforementioned physical characteristics, taken together with the elemental analysis, the nature of the starting materials, and the mode of synthesis, confirm the structure of the compositions sought to be patented.

The tangible embodiments of the invention possess the inherent applied use characteristic of exerting an antiandrogenic effect in animals as evidenced by pharmacological evaluation according to standard test procedures. This finding indicates potential interest for the treatment of antiandrogenic syndromes.

The process of making a specific embodiment of the compositions of the invention is illustrated schematically as follows:

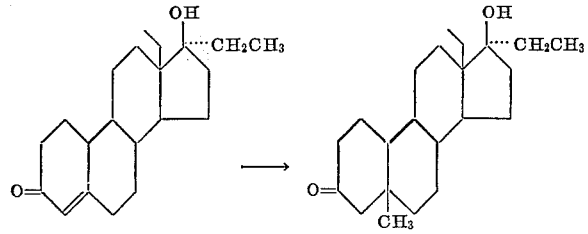

The manner of making the compositions of the invention will now be described so as to enable a person skilled in the art of chemistry to make and use the same as follows:

The 13β-polycarbon-alkylgon-4-enes which are employed as starting materials for the preparation of the compounds of the invention are prepared as described in Smith et al., Jour. Chem. Soc. 1964, 4472–4492. Addition of a 13β-polycarbon-alkylgon-4-ene to an excess of a lower alkyl Grignard reagent in the presence of cuprous chloride gives after decomposition of the Grignard adduct the corresponding 5-alkylgon-3-one. The reaction is preferably performed at temperatures below 0° C., and the preferred solvent is anhydrous tetrahydrofuran. Isolation of the product is performed in a conventional manner, preferably using ether to extract the organic materials.

It will be apparent from the disclosure herein to those skilled in the art of organic chemistry that for the purposes of the invention certain of the atoms of the gon-4-ene starting material can be substituted with groups which do not interfere with the subsequent reaction. Thus the 13-polycarbon lower alkyl group can be, for example, but without limiting the generality thereof, ethyl, propyl, butyl, or isobutyl. The 17-position may be substituted with hydroxy and an ethyl group as illustrated above, or it may be a 17-hydroxy-17-hydrogen, or 17-hydroxy-17-lower alkyl other than ethyl such as methyl, propyl, butyl; 17-hydroxy-17-lower alkkenyl, such as vinyl; or 17-hydroxy-17-lower alkynyl such as ethynyl. The starting materials can be substituted with an alkyl group such as methyl or ethyl at the 6- or 7-position.

The lower alkyl Grignard used as starting material can be methyl or it can be for example, but without limiting the generality thereof, of ethyl, propyl, butyl, or isobutyl.

When the starting compounds are substituted as hereinbefore recited it will be apparent herefrom to those skilled in the art of chemistry that the product will bear correspondingly the same substituents. Therefore, for the purpose of this invention the compositions produced in their inherent use are the full equivalents of the invention as particularly claimed.

The compositions of the invention can be formulated as solid capsules, tablets, etc., by combining with conventional carriers. The effective dosage depends upon the particular compound used and the characteristics of the case and can be determined by conventional methods. Generally a dosage range from 0.10 to about 15 mg. per kilogram of body weight per day represents the overall range.

The following examples illustrate the best mode contemplated by the inventors of making the compositions of the invention:

Example 1

Add 13,17α - diethyl-17β-hydroxygon-4-en-3-one (4.0 g.) in tetrahydrofuran (35 ml.) slowly to a mixture of 3 M methyl magnesium bromide (30 ml.), cuprous chloride (2.0 g.), and tetrahydrofuran (210 ml.) with vigorous stirring, maintaining the temperature of the reactants at about −18°. Continue stirring for 30 minutes after the addition of the Grignard is complete. Pour the reaction mixture into cold brine saturated with hydrogen chloride and collect the organic materials by extraction with ether. Remove the ether under reduced pressure, triturate the crystalline residue with hot ether and filter to obtain 13,17α-diethyl-17β-hydroxy-5-methylgon-3-one, M.P. 173–174°.

$\lambda_{max}^{KBr}$ 2.92, 5.87μ no absorption in the ultraviolet above 220 mμ.

Analysis for $C_{22}H_{36}O_2$: Calculated: C, 79.46; H, 10.92%. Found: C, 79.44; H, 10.97%.

By the above procedure, employing 13-ethyl-17α-ethynyl-17β-hydroxygon-4-en-3-one and methyl magnesium bromide as starting materials, there is obtained 13-ethyl-17α-ethynyl-17β-hydroxy-5β-methylgon-3-one, M.P. 176–178°;

$\lambda_{max.}^{KBr}$ 3.06, 5.90μ; $\lambda_{max.}^{EtOH}$ no selective absorption above 220μ

Analysis for $C_{22}H_{32}O_2$: Calculated: C, 80.44; H, 9.83%. Found: C, 80.10; H, 9.84%.

By the above procedure, employing 13,17-diethyl-17β-hydroxygon-4-en-3-one and ethyl magnesium bromide as starting materials and employing chromatographic separation on Florex XXS and grade II neutral alumina there is obtained 5β,13,17-triethyl-17β-hydroxy-gonan-3-one; M.P. 168–171°;

$\lambda_{max.}^{KBr}$ 2.87, 5.86μ

Analysis for $C_{23}H_{38}O_2$: Calulated: C, 79.71; H, 11.05%. Found: C, 79.71; H, 11.09%.

There is also obtained 3,13,17-triethyl-17β-hydroxy-gona-3,5-diene; M.P. 103–105°;

$\lambda_{max.}^{KBr}$ 2.90, 6.15μ; $\lambda_{max.}^{EtOH}$ 242 mμ (ε 19,000)

Analysis for $C_{23}H_{36}O$: Calculated: C, 84.08; H, 11.05%. Found: C, 83.81; H, 11.14%.

By the above procedure, employing 13,17-diethyl-17β-hydroxy-gon-4-en-3-one and butyl magnesium bromide as starting materials and chromatography on Florex XXS, there is obtained 13,17-diethyl-5β-butyl-17β-hydroxy-gonan-3-one; M.P. 138–140;

$\lambda_{max.}^{KBr}$ 2.92, 5.89μ

Analysis for $C_{25}H_{42}O_2$: Calculated: C, 80.15; H, 11.30%. Found: C, 80.16; H, 11.19%.

Also isolated was 3-butyl-13,17-diethyl-17β-hydroxy-gona-3,5-diene; M.P. 101–104°;

$\lambda_{max.}^{KBr}$ 2.92, 6.15μ

Analysis for $C_{24}H_{40}O$: Calculated: C, 84.21; H, 11.31%. Found: C, 84.22; H, 11.11%.

By catalytic hydrogenation of 13-ethyl-17α-ethynyl-17β-hydroxy-5β-methyl-gonan-3-ol in pyridine in the presence of 2 percent PdO/CaCO₃ as the catalyst followed by isolation and recrystallization of the product there is obtained 13-ethyl-17β-hydroxy-5β-methyl-17α-vinyl-gonan-3-one; M.P. 128–131° C.;

$\lambda_{max.}^{KBr}$ 2.90, 5.80, 10.97μ

Analysis for $C_{22}H_{34}O_2$: Calculated: C, 79.95; H, 10.37%. Found: C, 80.24; H, 10.10%.

EXAMPLE 2

Add dl-13-ethyl-17-hydroxy-3-methoxygona-1,3,5(10)-triene (200 g.) to a solution of succinic anhydride (200 g.) in pyridine (1,400 ml.) and heat under gentle reflux in a nitrogen atmosphere for six hours. Stir for an additional 66 hours at room temperature and then pour the reaction mixture into ice-cold hydrochloric acid prepared from conc. hydrochloric acid (2,000 ml.), water (2,000 ml.), and cracked ice (2,000 g.). Filter out the solid product, wash thoroughly with water, and dissolve in chloroform (2 liters). Wash the chloroform solution with brine and concentrate to about 450 ml. Cool to 0° C., filter off the precipitated dl-13-ethyl-17-hydroxy-3-methoxygona-1,3,5(10)-triene hemisuccinate (244.7 g.); M.P. 159–161°.

Mix dl-13-ethyl-17β-hydroxy-3-methoxygona-1,3,5(10)-triene hemisuccinate (50.7 g.) (0.125 mole), triethylamine (6.31 g.), and dehydroabietylamine (17.78 g.) in ethyl acetate (700 ml.). Stir the resulting suspension mechanically for 2.5 hours in an ice bath. Filter off the precipitated solids, wash the solids with cold ethyl acetate and recrystallize from ethyl acetate to provide l(−)-13-ethyl-17β-hydroxy-3-methoxygona-1,3,5(10)-triene hemisuccinate, dehydroabietylamine salt (24.5 g.); M.P. 167–169°.

Add to the mother liquors from the precipitation of the dehydroabietylamine salt l-1-(α-naphthyl)ethylamine (30 ml.) and allow the solution to stand overnight. Wash the precipitated solid with ether and recrystallize twice from ethyl acetate to obtain d(+)-13-ethyl-17β-hydroxy-3-methoxygona-1,3,5(10)-triene, hemisuccinate, l-1-(α-naphthyl)ethylamine salt (16.0 g.); M.P. 117–118.5°. Dissolve the pure salt in hot ethanol, make strongly basic with aqueous 20 percent sodium hydroxide and heat on a steam bath for 1.5 hours. Cool, make acid with acetic acid and add water to precipitate the product. Filter and dry to obtain d(+)-13-ethyl-17β-hydroxy-3-methoxygona-1,3,5(10)-triene; M.P. 103–106°; $[\alpha]_D^{25}=+49.5°$, (C=1, CHCL₃).

d(+)-13-ethyl-17β-hydroxy-3-methoxygona-1,3,5(10)-triene (10.65 g.) was reduced (Birch reduction) in freshly distilled liquid ammonia and tetrahydrofuran (350 ml.) with lithium metal (2 g.). Discharge the blue color by dropwise addition of ethanol, filter, and suspend in methanol. Maintain at −10° overnight. Filter and dry to obtain d(+)-13-ethyl-17β-hydroxy-3-methoxygonane-2,5(10)-diene (8.5 g.); M.P. 153–157°.

Azeotrope d(+)-13-ethyl-17β-hydroxy-3-methoxygona-2,5(10)-diene (5 g.) in toluene (200 ml.) and methyl ethyl ketone (80 ml.) to remove water and add aluminum isopropoxide (8 g.) in dry toluene (50 ml.). Reflux the solution under nitrogen for four hours, add water (8 ml.) and stir the reaction mixture for one-half hour. Remove solids by filtration, evaporate the solvent and triturate the solid residue with cold methanol to obtain d(+)-13-ethyl-3-methoxygona-2,5(10)-dien-17-one (3.9 g.); M.P. 185–189°;

$\lambda_{max.}^{KBr}$ 5.75, 5.90, 6.0μ no UV; $[\alpha]_D^{24}=+155°$ (C.=1, CHCl₃).

Suspend the d(+)-13-ethyl-3-methoxygona-2,5(10)-dien-17-one in dry DMAC and stir in a stream of acetylene for one-half hour. Add lithium acetylide-ethylene diamine complex (1.5 g.) and stir the clear solution for 2.5 hours. Pour the solution into water, extract with ether, wash the ether layer, dry and remove the solvent under reduced pressure. Triturate the residue with ice-cold methanol to obtain d(+)-13-ethyl-17α-ethynyl-17β-hydroxy-3-methoxygona-2,5(10)-diene (3.5 g.); M.P. 155–158° C.;

$\lambda_{max.}^{KBr}$ 2.9, 3.12, 5.9, 6.0μ

$[\alpha]_D^{24}=+51.4$ (c.=1, CHCL₃).

Mix 13-ethyl-17α-ethynyl-17β-hydroxy-3-methoxygona-2,5(10)-diene (3.5 g.) in methanol (135 ml.), water (6.0 ml.), and concentrated HCl (9.0 ml.). Stir under nitrogen for one hour. Add water (50 ml.) and stir the suspension for an additional hour. Filter out the precipitated crystalline solid and dry to obtain d(+)-13-ethyl-17-ethynyl-17β-hydroxygon-4-en-3-one (2.52 g.); M.P. 232–234°.

Add d(+)-13-ethyl-17-ethynyl-17β-hydroxygon-4-en-3-one (1.5 g.) in dry THF (20 ml.) to dry THF (50 ml.) containing 3 M MeMgBr (20 ml.) and CuCl (1.5 g.). Stir the mixture for one hour, pour into brine/HCl and extract with ether. Wash the ether extracts, dry, and remove the solvent. Recrystallize the residue from ether-hexane to obtain d(−)-13-ethyl-17α-ethynyl-17β-hydroxy-5β-methylgonan-3-one (0.985 g.); M.P. 178–181°;

$\lambda_{max.}^{KBr}$ 2.98, 3.06, 4.77, 5.90μ

$[\alpha]_D^{24}=-28°$ (c.=1, CHCl₃).

Analysis for $C_{22}H_{32}O_2$: Calculated: C, 80.44; H, 9.83%. Found: C, 80.08; H, 9.39%.

Add $d(-)$ - 13 - ethyl - 17γ - ethynyl - 17β - hydroxy - 5β - methylgonan - 3 - one (0.350 g.) in pyridine (10 ml.) to two percent $PdO/SrCO_3$ (0.085 g.) pre-reduced in pyridine (10 ml.). Add hydrogen until one mole equivalent of hydrogen has been absorbed (15 minutes). Filter out the catalyst, pour the filtrate into water and extract with ether. Wash the ether layer with dilute HCl, dry, and remove the solvent under reduced pressure. Recrystallize the solid residue from ether-hexane to obtain $d(+)$ - 13 - ethyl - 17β - hydroxy - 5β - methyl - 17α - vinylgonan - 3 - one (0.280 g.); M.P. 156–157°;

$\lambda_{max.}^{KBr}$ 2.95, 5.86, 10.95μ

$[\alpha]_D^{24}=+4°$ (c.=1, $CHCl_3$).

Analysis for $C_{22}H_{34}O_2$: Calculated: C, 79.95; H, 10.37%. Found: C, 80.24; H, 10.22%.

Add $d(-)$ - 13 - ethyl - 17α - ethynyl - 17β - hydroxy- 5β - methylgonan - 3 - one (0.350 g.) in benzene (30 ml.) to two percent $PdO/SrCO_3$ (0.060 g.) pre-reduced in benzene (10 ml.). Add hydrogen until two moles equivalent of hydrogen have been absorbed (one hour). Filter out the catalyst, remove the solvent, and recrystallize the residue from acetone-hexane to obtain $d(+)$ - 13,17α - diethyl - 17β - hydroxy - 5β - methylgonan - 3 - one (0.250 g.); M.P. 192–193°;

$\lambda_{max.}^{KBr}$ 2.9, 5.86μ

$[\alpha]_D^{24}=+6°$ (c.=1, $CHCl_3$).

Analysis for $C_{22}H_{36}O_2$: Calculated: C, 79.46; H, 10.92%. Found: C, 79.51; H, 10.54%.

We claim:
1. A compound of the structure

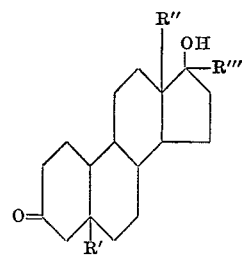

wherein
R' is lower alkyl,
R'' is polycarbon lower alkyl, and
R''' is selected from the group consisting of hydrogen, lower alkyl, lower alkenyl, and lower alkynyl.

2. The composition of claim 1 wherein R' is methyl, R'' is ethyl and R''' is ethyl.

3. The composition of claim 1 wherein R' is methyl, R'' is ethyl and R''' is ethynyl.

4. The composition of claim 1 wherein R' is ethyl, R'' is ethyl and R''' is ethyl.

5. The composition of claim 1 wherein R' is butyl, R'' is ethyl, and R''' is ethyl.

6. The composition of claim 1 wherein R' is methyl, R'' is ethyl and R''' is vinyl.

No references cited.

HENRY A. FRENCH, *Primary Examiner.*

U.S. Cl. X.R.
260—397.5; 167—74